United States Patent [19]
Lewis et al.

[11] Patent Number: 5,786,531
[45] Date of Patent: Jul. 28, 1998

[54] COMPRESSION RATIO MEASUREMENT

[75] Inventors: Earl O. Lewis, Fowlerville; Steven Frederick Haller, Highland, both of Mich.

[73] Assignee: General Motors Corporation, Detroit, Mich.

[21] Appl. No.: 807,156

[22] Filed: Feb. 27, 1997

[51] Int. Cl.$^6$ .................................................. G01M 15/00
[52] U.S. Cl. ........................... 73/116; 73/47; 73/49.7
[58] Field of Search ............................ 73/47, 49.7, 115, 73/116

[56] References Cited

U.S. PATENT DOCUMENTS

| | | | |
|---|---|---|---|
| 4,505,152 | 3/1985 | Haddox | 73/115 |
| 4,633,707 | 1/1987 | Haddox | 73/47 |
| 4,836,015 | 6/1989 | Krage | 73/117.2 |
| 5,203,822 | 4/1993 | Gurich et al. | |
| 5,417,109 | 5/1995 | Scourtes | 73/47 |

*Primary Examiner*—Richard Chilcot
*Assistant Examiner*—Eric S. McCall
*Attorney, Agent, or Firm*—Michael J. Bridges

[57] ABSTRACT

Internal combustion engine cylinder compression ratio measurement is provided by applying a train of pressure pulses to an engine cylinder, measuring time rate of change in pressure within the cylinder and estimating a volume of air within the cylinder from the measured time rate of change. The cylinder air volume may be compensated for such effects as change in cylinder air temperature away from a calibration temperature or cylinder leakage. The time rate of change in pressure is measured at an engine angular position corresponding to a known volume within the cylinder, for example an engine angular position corresponding to the cylinder top dead center position, and cylinder compression ratio is determined from the estimated volume of air in the cylinder and the known cylinder volume.

9 Claims, 3 Drawing Sheets

COMPRESSION RATIO MEASUREMENT

TECHNICAL FIELD

This invention relates to internal combustion engine analysis and, more particularly, to measurement of internal combustion engine cylinder compression ratio.

BACKGROUND OF THE INVENTION

The compression ratio of internal combustion engine cylinders, generally defined as the ratio of maximum cylinder gas pressure to ambient pressure, directly relates to engine efficiency and is a critical engine design parameter. Measurement of actual compression ratio in engine cylinders is important in engine development work and in engine durability analysis. Current procedures for measuring compression ratio include a whistle machine approach in which the tone of an audible output of a whistle device installed within an engine cylinder indicates cylinder volume, with compression ratio determined as a function of the indicated cylinder volume. The whistle machine is expensive, prone to breakage, cumbersome to calibrate, and extremely sensitive to the environment in which it is operated, making it difficult to effectively operate. A compression ratio measurement proposal of U.S. Pat. No. 5,203,822 attempts to directly measure leakage in a cylinder by closely regulating a test pressure and a test flow applied to the cylinder over a test period, and determines compression ratio directly from the measured leakage. The approach of this patent requires complex and expensive pressure and flow regulating hardware including complex calibration procedures, making it difficult and expensive to operate.

It would be desirable to accurately measure compression ratio in engine cylinders with inexpensive analysis hardware and through relatively simple calibration and analysis procedures.

SUMMARY OF THE INVENTION

The present invention is directed to accurate compression ratio measurement using inexpensive hardware and relatively simple calibration and analysis procedures. More specifically, a simple train of pressure pulses are applied to a cylinder being analyzed and, with the engine in an angular position within an engine cycle at which a cylinder volume is specified, the time rate of change in pressure within the cylinder is monitored. The monitored time rate of change is applied to a calibrated relationship between time rate of change in pressure and volume of gas within the cylinder to reference a total volume within the cylinder at the current engine angular position. The referenced total volume and the specified cylinder volume are applied to directly estimate cylinder compression ratio.

In accord with a further aspect of this invention, compression ratio measurement precision is enhanced by compensating for cylinder gas temperature effects during the measurement process. A temperature probe is exposed to test gases to transduce gas temperature into a temperature signal. The temperature signal is applied to reference a temperature compensation value which is applied to correct the total volume and the corrected volume is then applied along with the specified cylinder volume to estimated cylinder compression ratio.

In accord with yet a further aspect of this invention, the measurement hardware is applied to accurately orient the engine in a test position at which test position the cylinder volume is specified. More specifically, while the engine is slowly rotated through at least one engine cycle, the pressure pulses are applied to the cylinder and the cylinder pressure is monitored. When a pressure value characteristic of the test position is identified, engine rotation is suspended and time rate of change in pressure is monitored as described. In accord with yet a further aspect of this invention, the test position is selected as a position at which cylinder volume is at a limit and the characteristic cylinder pressure is at a corresponding limit. The pressure value characteristic of the test position is then simply identified as a pressure peak value, greatly reducing calibration requirements.

In accord with still a further aspect of this invention, cylinder leakage is estimated and a leakage correction value is determined through application of the cylinder leakage estimate to a calibrated function. The leakage correction value is applied to correct the total volume value and the corrected total volume value is applied to more accurately estimate cylinder compression ratio. In accord with yet a further aspect of this invention, a cylinder volume correction value representing the change in total cylinder volume due to application of the measurement hardware to the cylinder is applied to correct the total volume, and the corrected total volume is then applied to more precisely estimate cylinder compression ratio.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
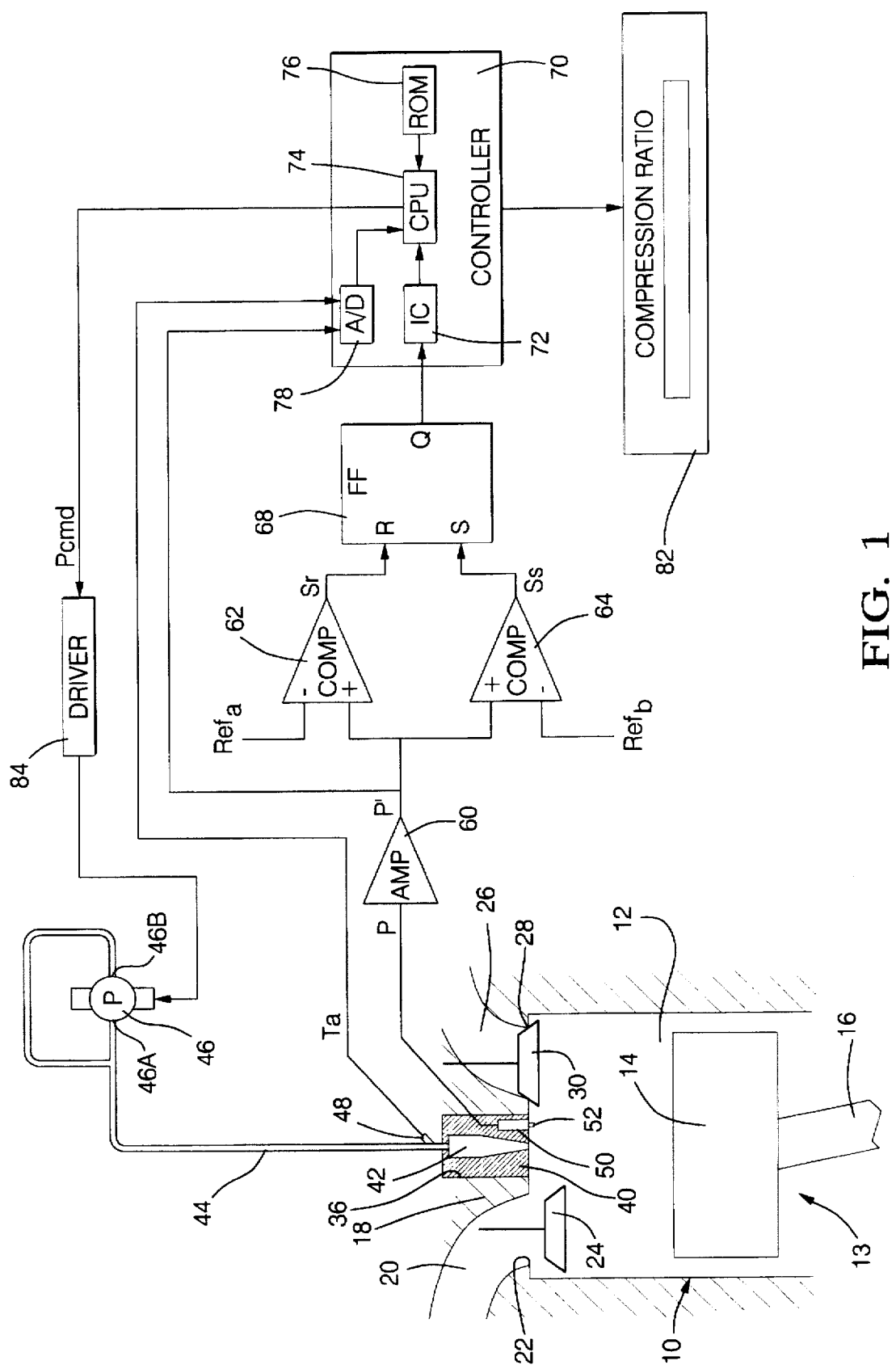
FIG. 1 is a general diagram of the compression ratio measurement system of the preferred embodiment of this invention.

Referring to FIG. 1, a representative cylinder 10 of a multi-cylinder internal combustion engine includes a cylinder chamber 12 in which a piston 13 having a piston head 14 is reciprocally driven to translate drive force through a connecting rod 16 to an engine output shaft (not shown). A cylinder head 18 covers the cylinder chamber 12 and includes an intake runner 20 terminating at a cylinder intake bore 22. An intake valve 24 seals against the intake bore 22 in a normally closed position and is driven away from the intake bore 22 during a cylinder intake event to allow gasses to be drawn from the runner 20 into the cylinder chamber 12. The cylinder head 18 further includes an exhaust runner 26 terminating at a cylinder exhaust bore 28. An exhaust valve 30 seals against the exhaust bore in a normally closed position and is driven away from the exhaust bore 28 during a cylinder exhaust event to allow exhaust gasses to be driven out of the cylinder chamber 12 and through the exhaust runner 26. The cylinder head 18 further includes a threaded spark plug bore 36 for normally receiving a spark plug (not shown). However, for the compression ratio measurement operations of this embodiment within the scope of this invention, an adapter 40 having an air channel 42 therethrough is sealingly received within the threaded spark plug bore 36. A length of tubing 44 of the braided high pressure type is sealed at a first end within the air channel 42 and is sealed at a second end at both an inlet 46a and an outlet 46b of a standard pneumatic pump 46. A conventional pressure transducer 50 is retained within the adapter 40 with a sensing end 52 of the transducer extending into the cylinder chamber to transduce pressure of gasses within the cylinder into an output signal P. A conventional temperature transducer 48 of the thermistor or thermocouple type is positioned within the length of tubing 44 in proximity to the adapter 40 for transducing the temperature of the gas in the tubing in proximity to the cylinder 10 into output signal Ta.

The signal P is applied to a standard differential amplifier AMP 60 having an output signal applied to the non-inverting input of first and second standard comparator circuits, 62 and 64, respectively. A predetermined voltage reference signal $Ref_a$ of about 0.5 volts in this embodiment is applied to the inverting input of the first comparator circuit 62 and a predetermined voltage reference signal $Ref_b$ of about −0.5 volts in this embodiment is applied to the inverting input of the second comparator circuit 64. The reference voltages may be generated through any standard signal generator device or through simple voltage divider circuitry applied to a standard voltage supply signal. The output signal Sr of comparator circuit 62 is applied to a RESET input R of any standard suitable storage device 68, such as a R-S flip flop device, with the output signal Ss of comparator circuit 64 applied to the SET input S of such device 68. The output signal Q of the storage device 68 is applied to a standard input port 72 of a controller 70. The input port 72 takes the form of an input capture port and the controller takes the form of any suitable commercially available control circuitry, such as a MC68HC11 single chip microcontroller device including such generally known components as a central processing unit CPU 74 for carrying out general processing and control functions and including standard arithmetic logic circuitry (not shown) for carrying out arithmetic and logic functions, a read only memory device ROM 76 for permanent data and program instruction storage, an analog to digital converter device for converting analog input information into digital form for use by the CPU 74 at a predetermined conversion rate. The output signal of the amplifier AMP 60 is applied as a direct input to the controller 70. The controller 70 outputs display information to a standard display unit 82. For example, a compression ratio of the cylinder 10 estimated through operations of the controller 70 in accordance with this invention, may be output to the display device 82 for display to an operator.

The controller 70 issues, during a test procedure, a drive signal Pcmd to a standard pump driver 84 for driving the vacuum pump 46 at a predetermined drive frequency to supply, through the tubing 44 connected to the inlet 46a and outlet 46b of the pump 46, a sequence of pressure pulsations through the tubing 44 and into the cylinder, the sequence maintained at the drive frequency. In this embodiment, the drive frequency is about thirty Hertz. Functionally, pressure variation in the cylinder is transduced by transducer 50 into a sinusoidal output signal P of about thirty Hertz in this embodiment, driven by the described pump drive frequency. Signal P is amplified through amplifier AMP 60 and is applied as signal P' to the comparators 62 and 64. A typical waveform of signal P' is illustrated in FIG. 3A.

Figure 3A:
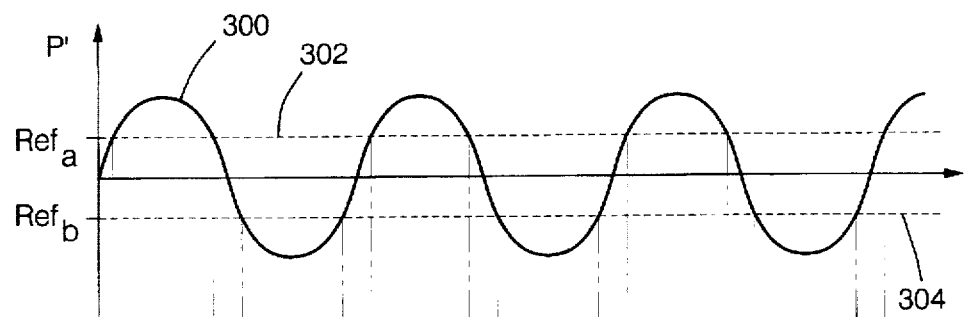
FIGS. 3A–3D are signal timing diagrams illustrating signals generated in the compression ratio measurement system of FIG. 1.
Figure 3B:
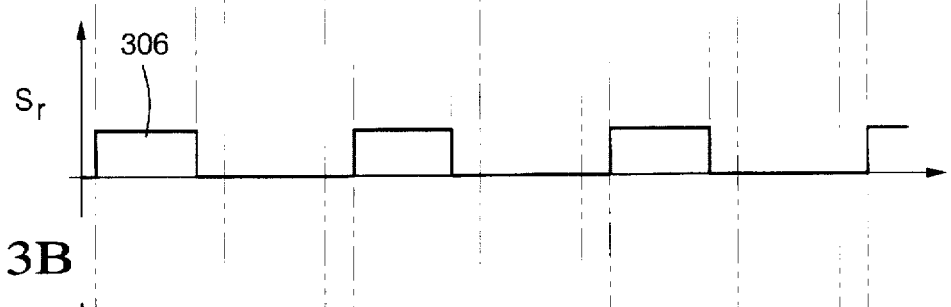
Figure 3C:
Figure 3D:
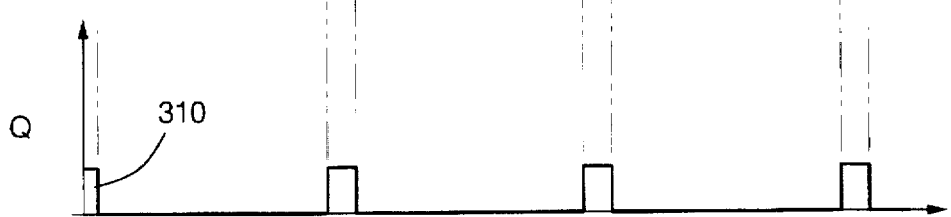

As illustrated in FIGS. 3A and 3B, signal Sr 306 is set to a high voltage level when signal P' exceeds the reference voltage Refa 302 of about +0.5 volts in this embodiment and is otherwise reset to a low voltage level. As illustrated in FIGS. 3A and 3C, signal Ss 308 is set to a high voltage level when signal P' exceeds Refb 304 of about −0.5 volts in this embodiment and is otherwise reset to a low voltage level. The edge sensitive storage device 68 (FIG. 1) output signal Q is, as is generally understood in the art, set to a high voltage level following a rising edge of its set input S and is reset to a low voltage level following a rising edge of its reset input R. Accordingly, and as illustrated in FIG. 3D, the output signal Q 310 takes the form in this embodiment of a periodic pulse of duration corresponding to the time required for the signal P' (FIG. 3A) to rise from Refb to Refa (also referred to herein as the signal rise time). The thirty Hertz waveform P is, in this embodiment, substantially centered at zero volts and is amplified by amplifier stage 60 to substantially greater that two volts, peak to peak, to allow for a rise time measurement of a substantially linear portion of the waveform P' 300 (FIG. 3A).

The output Q is applied to an input capture port IC 72 of the controller 70 which port is configured in a well-known manner to store the time of receipt of signal edges in storage registers. From such stored time values, the controller may readily determine an elapsed time value representing the time between edges of pulses appearing at the port 72. Such an elapsed time value therefore represents, in this embodiment, the signal rise time. Voltage signal P' is further applied directly to an analog to digital converter device 78 integrated into the controller 70, yielding a numeric value representing the magnitude of P', from which the controller determines when the piston 13 is at a top dead center position within the cylinder 10, at which position cylinder volume measurement is made, as will be described. Air temperature signal Ta is likewise applied to an analog to digital converter device 78 of the controller 70, yielding a digital output applied to the CPU in the form of a numerical value representing air temperature in the tubing 44 in proximity to the cylinder 10.

Generally, the volume of the chamber 12 within the cylinder 10 into which the pressurized air from tubing 44 may pass is at a minimum at the well-known cylinder top dead center position, whereby the pressure within the cylinder chamber 12 will be at a maximum with the pump operating at a substantially constant output level. The maximum pressure condition may be detected as signal P' being at a maximum signal amplitude, as converted to digital form through the analog to digital converter device 78. Accordingly, when the engine is positioned such that the piston 13 is at its top dead center position within the cylinder 10 as indicated by a maximum digital equivalent of signal P' as determined through controller 70 operations (as will be detailed in FIG. 2) cylinder volume analysis may be carried out within the scope of this invention, leading to an accurate measurement of cylinder compression ratio within the scope of this invention. The compression ratio information, as well as cylinder volume and other generally useful information may be communicated directly to the display device 82 or may be stored in a standard controller memory storage device.

Figure 2:
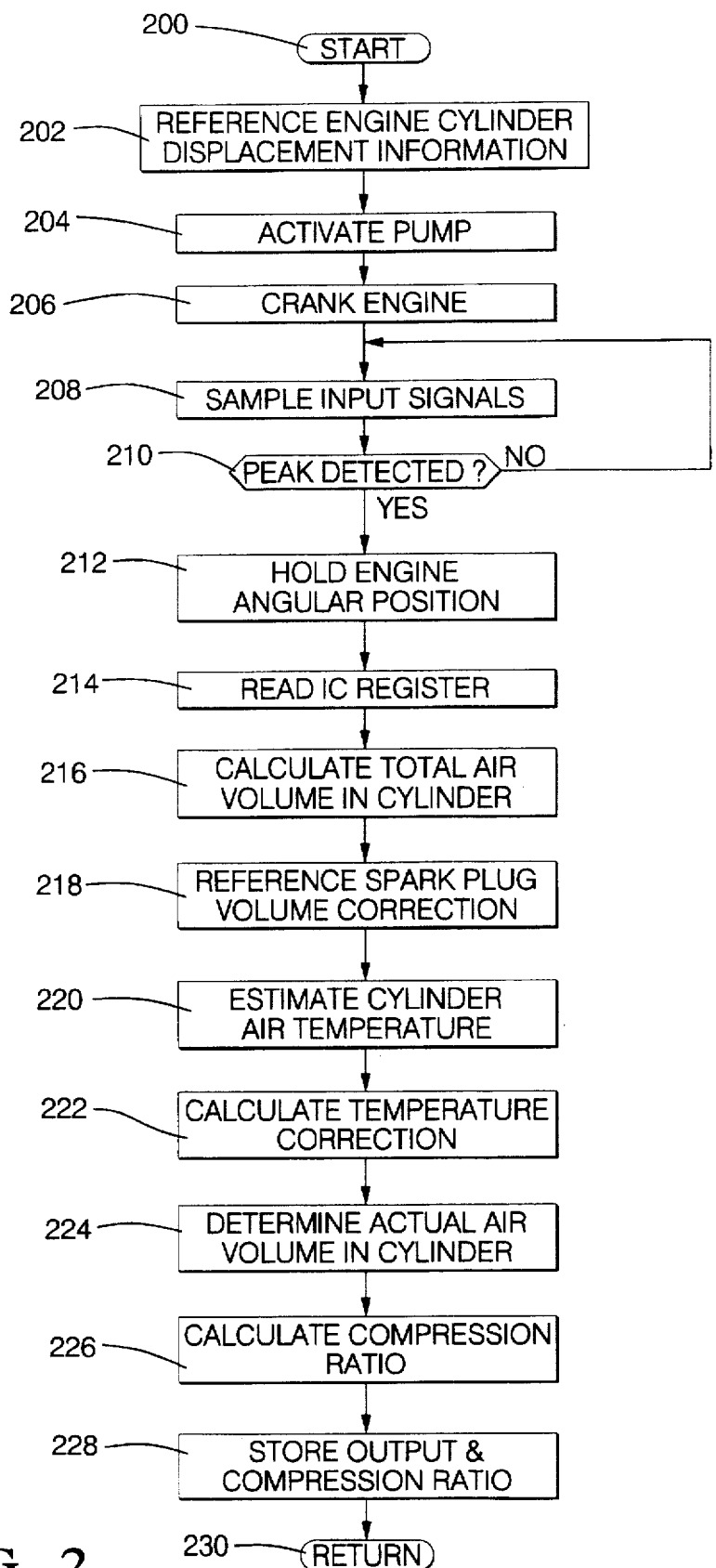
FIG. 2 is a flow diagram illustrating a flow of operations of the system of FIG. 1 for measuring compression ratio.

Referring to FIG. 2, a sequence of operations for carrying out compression ratio measurement in accord with the preferred embodiment of this invention are detailed. Such operations may be implemented as standard software instructions stored in non-volatile memory devices, such as read only memory devices ROM 76 (FIG. 1) of the controller. The instructions may be accessed by the controller 70 whenever compression ratio measurement operations are to be applied to an engine cylinder, such as the cylinder 10 of FIG. 1. The operations of FIG. 2 commence at a step 200 and proceed to reference, such as from controller memory devices, engine specification information at a next step 202, including the number of engine cylinder and the engine displacement information. Information indicating the volume of individual engine cylinders at a top dead center piston position within the cylinders is provided at the step 202. The information provided at the step 202 may be provided manually by a test operator at the step 202, or may be provided through controller 70 accessing such information from a ROM device 76, for example as corresponding to standard engine specification information provided by an engine supplier or designer, or as measured by a test operator through the application of ordinary skill in the art and through use of generally known measurement procedures.

The pump 46 (FIG. 1) is next activated at a step 204 by applying a drive signal Pcmd at an active signal level to the pump driver 84 (FIG. 1) to cyclically drive the pump, such as at about thirty Hertz, as described. The pump outlet and inlet are open to each other, as described and are open to tubing 44 which is applied to the engine cylinder 10 under test, whereby a periodic pressure pulse is applied to the available volume in the cylinder chamber 12. While the pump is operating, a cylinder top dead center position is identified and held via next steps 206–212.

Specifically, the engine is manually rotated at a step 206, such as by manually or automatically cranking the engine. For example, a standard crank is provided in the form of a commercially available starter motor or a manual crank arm (not shown) secured to an engine output shaft (not shown) such as a crankshaft to rotate the shaft and back-drive the pistons including piston 13 (FIG. 1) in a relatively slow manner at the step 206. While such cranking action is ongoing, input signals including signal P' are sampled by the controller 70 at a next step 208 and a peak signal amplitude of the signals P' is detected at a next step 210. Generally, the signal P' peak is determined following a number of sampled P' signal values as converted to digital values via the analog to digital converter device A/D 78 (FIG. 1).

Over at least one complete engine cycle, peak value of P' will be determined by the controller 70 or manually. For example, the controller may simply store the highest output value of the A/D 78 over at least one complete engine cycle. After such peak has been identified, the engine is cranked and the input signals including signal P' are periodically sampled at the step 208 until such identified peak recurs, as detected at the step 210, after which the engine angular position within an engine cycle is held at a next step 212. The detected peak corresponds to an engine operating angle within an engine cycle at which the cylinder 10 under test is of minimum volume, which corresponds to the piston 13 top dead center position within the cylinder, at which the cylinder chamber volume is known from engine specification information, such as that provided at the described step 202.

Following the step 212, the input capture register IC 72 (FIG. 1) is read at a next step 214 to determine a current pressure rise time signal value. The register may be re-read a predetermined number of times at the step 214 to arrive at a plurality of register values representing various rise time measurements, which may be statistically combined, for example by simply averaging the values or by applying the plurality of values to the generally known exponentially weighted moving average process, to arrive at a single value representative of the rise time of cylinder pressure at the current top dead center cylinder position. The determined rise time is next applied to determine the total air volume Tav in the cylinder at a next step 216 by applying the determined rise time to a stored function or a stored lookup table representing a calibrated relationship between rise time of the thirty Hertz waveform in the engine cylinder and cylinder air volume. The calibration procedure for establishing the relationship between rise time and cylinder air volume includes, in this embodiment, the steps of applying the thirty Hertz pressure waveform of FIG. 1 to a controlled volume and monitoring the rise time of the pressure waveform described for the system of FIG. 1 within the controlled volume.

Various controlled volumes may be calibrated in this manner and the results stored in the form of a lookup table having a plurality of entries of rise time, each entry being paired with the corresponding known control volume. Alternatively, a function, such as a third order polynomial function, may be determined defining the relationship between rise time and air volume from the calibration information and stored in ROM 76, through any standard curve fit procedure, such as a standard third order least squares curve fit procedure. In this embodiment, for convenience, rise time is expressed in an equivalent input capture register pulse width value, and the function or lookup table describing the relationship between rise time and air volume is implemented in air volume as a function of the value in the input capture register.

Accordingly, upon determining the rise time at the step 214 as expressed in the form of an input capture register value, a corresponding cylinder air volume value may be readily determined at the step 216 by applying the pulse width to the stored lookup table and interpolating in any standard manner between table entries, if necessary, or by applying the input capture register value to the determined function. Following the total air volume determination at the step 216, a spark plug volume correction is referenced from a memory device, such as a ROM device 76 (FIG. 1) at a next step 218, representing an offset required to correct for the change in cylinder volume caused by application of the adapter 40 to the spark plug bore 36. More specifically, any change in the available cylinder chamber 12 volume caused by application of the adapter 40 to the engine over standard engine operating conditions is compensated by a stored value referenced at the step 218.

Cylinder air temperature is next estimated at a step 220 as a calibrated function of the controller input signal Ta (FIG. 1) with the calibrated function determined through a standard calibration procedure. A temperature correction is next generated at a step 222 as a function of the estimated cylinder air temperature. A calibration procedure for determining the change in rise time of cylinder pressure as a function of change in cylinder air temperature of any conventional type may be provided, for example by holding cylinder volume substantially at a volume corresponding to that of the cylinder top dead center position, and then monitoring change in rise time and cylinder air temperature changes along a normal temperature range from a minimum (coldstart) temperature to an upper temperature limit value. The result of such calibration procedure may be stored in the form of a lookup table in ROM 76 (FIG. 1) or may be applied in a curve fitting procedure, such as a standard least squares curve fit procedure, to generate a function stored in ROM 76. The estimated cylinder air temperature is then applied to the function or the lookup table to retrieve a correction factor corresponding thereto at the step 222.

Actual air volume in the cylinder Va is next determined at a step 224 as follows:

$$Va = Tav + Cat + Cl$$

in which Tav is the total air volume in the cylinder 10 (FIG. 1) as determined at the step 216, Cat is the air temperature correction determined at the step 216, and Cl is a leakage correction to account for any known or estimated cylinder leakage, such as may be determined through any known cylinder leakage estimation procedure.

Cylinder compression ratio CR is next determined at a step 226 from the determined actual air volume in the cylinder as follows:

$$CR=(CD+Va-Vsp)/(Va-Vsp)$$

in which CD is the volume (displacement) of the cylinder at the top dead center position, and Vsp is the spark plug volume correction referenced at the described step 218. The determined compression ratio is next stored in any standard storage device of the controller 70 (FIG. 1), such as a random access memory device (not shown) and is further output to the display device 82 (FIG. 1) for display. The operations of FIG. 2 then are concluded at a next step 220, to return to and resume execution of any required controller operations, such as standard maintenance or diagnostic operations.

The preferred embodiment is not intended to limit or restrict the invention since many modifications may be made through the exercise of ordinary skill in the art without departing from the scope of the invention.

The embodiments of the invention in which a property or privilege is claimed are described as follows:

1. A method for estimating compression ratio of a cylinder of an internal combustion engine, comprising the steps of:

identifying an operating angle of the engine within an engine cycle at which operating angle the volume of the cylinder is known;

transducing air pressure in the cylinder into a cylinder pressure signal;

applying a pulse of air to the cylinder while the engine is substantially at the identified operating angle;

estimating a time rate of change in air pressure in the cylinder while the engine is substantially at the identified operating angle;

calculating air volume in the cylinder as a function of the time rate of change; and determining cylinder compression ratio as a function of the known volume of the cylinder and of the calculated air volume.

2. The method of claim 1, further comprising the steps of:

estimating air temperature in the cylinder during the application of the pulse of air to the cylinder;

generating an air temperature correction value as a function of the estimated air temperature; and correcting the calculated air volume by applying the air temperature correction value thereto;

and wherein the step of determining compression ratio determines compression ratio as a function of the known volume of the cylinder and of the corrected air volume.

3. The method of claim 1, further comprising the steps of:

estimating cylinder leakage at the identified operating angle;

generating a leakage correction value as a function of the estimated cylinder leakage;

correcting the calculated air volume by applying the leakage correction value thereto; and wherein the step of determining compression ratio determines compression ratio as a function of the known volume of the cylinder and of the correction air volume.

4. The method of claim 1, wherein the identified operating angle is an engine operating angle corresponding to a volume limit within the cylinder and wherein the applying step applies a series of pulses of air to the cylinder, the method further comprising the steps of:

monitoring the cylinder pressure signal;

identifying when the cylinder pressure signal is at a signal limit value corresponding to the volume limit within the cylinder; and determining that the engine is substantially at the identified operating angle when the cylinder pressure signal is at the signal limit value.

5. The method of claim 1, wherein the identified operating angle is an engine operating angle corresponding to a minimum volume within the cylinder, the method further comprising the steps of:

monitoring the cylinder pressure signal;

identifying when the cylinder pressure signal is at a peak signal magnitude; and determining that the engine is substantially at the identified operating angle when the cylinder pressure signal is at the peak signal magnitude.

6. An engine cylinder compression ratio measurement system, comprising:

an air pulse supply;

an air passage between the air pulse supply and the engine cylinder for communicating air pulses between the air pulse supply and the engine cylinder;

a pressure transducer exposed to the gasses within the engine cylinder for transducing cylinder gas pressure into a pressure signal;

drive circuitry for driving the air pulse supply to communicate air pulses to the cylinder;

sensor circuitry for detecting when the engine is at a predetermined rotational position within an engine cycle at which predetermined rotational position the volume of the cylinder is specified;

circuitry for receiving the pressure signal and generating a time rate of change in pressure as a function of the received pressure signal upon detecting that the engine is at the predetermined rotational position and while the air pulse supply is communicating air pulses to the cylinder; and arithmetic logic circuitry for generating an estimate of cylinder compression ratio as a function of the time rate of change in pressure and of the specified cylinder volume.

7. The system of claim 6, Wherein the predetermined rotational position corresponds to a cylinder volume limit, and wherein the sensor circuitry comprises:

circuitry for receiving the pressure signal and identifying a pressure signal limit value corresponding to the cylinder volume limit, and for detecting that the engine is at the predetermined rotational position when the pressure signal limit value is identified.

8. The system of claim 6, wherein the predetermined rotational position corresponds to a top dead center position of the cylinder with a minimum cylinder volume, and wherein the sensor circuitry comprises:

circuitry for receiving the pressure signal and identifying a maximum pressure signal value and for detecting that the engine is at the predetermined rotational position when the maximum pressure signal value is identified.

9. The system of claim 6, wherein the air pulse supply comprises (a) a pump having an inlet and an outlet, and (b) a supply line opening into both the pump inlet and outlet and into the air passage;

and wherein the drive circuitry further comprises a pump driver circuit for driving the pump at a predetermined drive frequency.

* * * * *